(12) United States Patent
Wolter et al.

(10) Patent No.: US 7,850,881 B2
(45) Date of Patent: Dec. 14, 2010

(54) INORGANIC HOLLOW FIBERS

(75) Inventors: Herbert Wolter, Tauberbischofsheim (DE); Werner Storch, Höchberg (DE); Thomas Ballweg, Wertheim (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1284 days.

(21) Appl. No.: 10/900,380

(22) Filed: Jul. 28, 2004

(65) Prior Publication Data

US 2004/0261459 A1    Dec. 30, 2004

Related U.S. Application Data

(62) Division of application No. 10/221,559, filed as application No. PCT/DE01/00900 on Mar. 7, 2001, now abandoned.

(30) Foreign Application Priority Data

Mar. 14, 2000  (DE) ................. 100 12 308

(51) Int. Cl.
*C08G 77/06* (2006.01)
*C08G 77/00* (2006.01)

(52) U.S. Cl. ........................................... 264/42

(58) Field of Classification Search ............ 264/42; 501/95.1
See application file for complete search history.

(56) References Cited

U.S. PATENT DOCUMENTS

| | | | |
|---|---|---|---|
| 3,014,799 A * | 12/1961 | Oster | 522/46 |
| 4,238,590 A | 12/1980 | Scholze et al. | |
| 4,374,696 A | 2/1983 | Schmidt et al. | |
| 4,446,024 A * | 5/1984 | Baker et al. | 210/500.21 |
| 4,853,001 A | 8/1989 | Hammel | |
| 5,116,472 A | 5/1992 | Wolter et al. | |
| 5,233,006 A | 8/1993 | Wolter et al. | |
| 5,358,674 A * | 10/1994 | Rabe | 264/433 |
| 5,674,964 A | 10/1997 | Wolter et al. | |
| 5,707,584 A * | 1/1998 | Terpstra et al. | 264/628 |
| 5,777,057 A | 7/1998 | Glaubitt et al. | |
| 5,792,881 A | 8/1998 | Wolter et al. | |
| 5,810,912 A | 9/1998 | Akiyama et al. | |
| 5,919,885 A | 7/1999 | Wolter et al. | |
| 6,124,491 A | 9/2000 | Wolter et al. | |

FOREIGN PATENT DOCUMENTS

| | | |
|---|---|---|
| DE | 2758415 A1 | 7/1979 |
| DE | 3826715 C2 | 2/1990 |
| DE | 3835968 A1 | 6/1990 |
| DE | 4011044 A1 | 10/1991 |
| DE | 4310733 A1 | 10/1994 |
| DE | 4416857 C1 | 6/1995 |
| DE | 4405261 A1 | 8/1995 |
| DE | 19627198 A1 | 1/1997 |
| DE | 19627220 A1 | 1/1997 |
| DE | 19701751 A1 | 7/1997 |
| EP | 0263406 A2 | 4/1988 |
| EP | 0591812 A1 | 4/1994 |

OTHER PUBLICATIONS

Betty F. Smith et al., Textiles in Perspective, 1982, Prentice-Hall, Inc., p. 359.*
Betty F. Smith et al., Textiles in Perspective, 1982, Prentice-Hall, Inc., pp. 70-73.*
Haase et al., (Noll, Chemie Und Technologie der Silicone), "*Synthese von Methacryloyl-Spiroorthoestern*," Journal f. prakt,. Chemie. Band 330, Heft 2. 1988, S. 316-318, 1968.
Walter Noll, "Chemie und technologie der silicone," Verlag Chemie GmbH, Weinheim/Berstraβe (1968), pp. 316-318.

* cited by examiner

*Primary Examiner*—Christina Johnson
*Assistant Examiner*—Patrick Butler
(74) *Attorney, Agent, or Firm*—Hunton & Williams LLP

(57) ABSTRACT

The invention relates to inorganic hollow fibers, to a spinning mass and to a method for producing the same as well as to the use thereof for material transports, for the exchange of gases and in separation procedures. The hollow fibers according to the invention are obtainable by processing a spinning mass to a hollow fiber according to general methods, by curing said fiber thermally, via radiation induction or via chemical induction, and by removing the organic components via pyrolysis. The spinning mass is obtained by hydrolytic polycondensation of hydrolyzable compounds of silicon, aluminum, titanium and zirconium and optionally of co-condensable compounds of the elements Li, Na, Mg, Ca, Sr, Ba, Zn, Sn or Pb. The hydrolytic polycondensation is performed by adding water or moisture. If desired, monomers or oligomers which may undergo co-polymerization or (poly)addition, curing catalysts, pore generating additives or compounds of the elements Li, Na, Mg, Ca, Sr, Ba, Zn, Sn and Pb which are soluble in the reaction medium are added to the spinning mass.

23 Claims, No Drawings

INORGANIC HOLLOW FIBERS

CROSS-RELATED AND PRIORITY APPLICATIONS

The present application is a divisional of U.S. Application No. 10/221,559, filed Dec. 16, 2002, which is a §371 National Phase Application of PCT/DE01 /00900, filed Mar. 7, 2001, which claims the benefit of German Patent Application No. DE 100 12 308.2, filed Mar. 14, 2000. The disclosures of these priority applications are hereby incorporated herein by reference in their entirety.

FIELD OF THE INVENTION

The invention relates to inorganic hollow fibers, to a spinning mass and to a method for producing the same as well as to the use thereof for material transport, for the exchange of gas and in separation procedures, specifically in the separation of gases, in dialysis, in pervaporation, as well as in micro, ultra and hyper filtration. The hollow fibers of this invention are porous or non-porous, permeable or impermeable.

DESCRIPTION OF THE RELATED ART

A wide variety of membrane materials is known for the separation of mixtures of materials or substances, but all of these are improvable in respect to their technical ability to be used and their economic efficiency. Thus, heat and pressure resistance of known materials, for example of cellulose acetate, is low, and these materials swell in organic solvents to a high degree. The low resistance against heat, pressure and solvents causes a persistent change of the pore size during technical use and consequently irreproducible results as well as low service times of the membranes.

For example, ultra filtrations are mostly performed in aqueous systems, which requires specifically high qualification in respect to mechanical and thermal stability (sterilizability up to 140° C.) of the membranes used in these cases, in respect to the resistance thereof against acids and alkaline materials, and in respect to their hydrophilic/hydrophobic properties which should be selectively adjustable. Polymers used for the preparation of membranes until now, cannot fulfill the said requirements at the same time, and for instance, they do not perform a sufficient mechanical stability, if the thermal stability thereof up to about 140° C. is relatively good.

In principle, porous and non-porous membranes are considered as different having different mechanisms in regard to material transport.

Very high values for the permeation of gases may only be obtained using very specific polymers (silicones, substituted polysilylpropines, polyimides, and the like) if these polymers are not porous. However, the high permeability for gases is only attained along with extreme decreases of the mechanical properties. An increasing permeability is connected with a reduction of strength and elastic modulus, i.e. the material becomes increasingly softer. As a result, free-supporting, stabile hollow fibers having a low wall thickness cannot exist.

The chemical and the thermal stability of porous $SiO_2$ hollow fibers is not particularly satisfactory in the presence of water vapor. Such hollow fibers are deficient in regard to their hydrolytic resistance, specifically in their resistance against alkaline materials.

BRIEF SUMMARY OF THE INVENTION

It is the problem of the present invention to provide hollow fibers and membranes made of hollow fibers for the transport and the separations of materials and for the exchange of gases the capability of which in regard to said exchange is variable in broad ranges and can be adapted to the requirements of the respective use. Specifically, porosity, pore size and pore size distribution shall be variable and adjustable. The pore sizes shall also cover the nanometer and sub-nanometer range. Selectivity and separation properties of the hollow fiber membranes shall be variable over broad ranges and adaptable to the requirements of the respective use. In addition, the hollow fibers shall exhibit high selectivity along with high mechanical stability, specifically in respect to gases in order to make them suitable for the exchange of gases and for the separation of materials. For specific uses, the hollow fibers shall be toxicologically safe and consequently useful in the medical field.

In addition, it is a problem of the present invention to provide a method for the production of hollow fibers and hollow fiber membranes the profile of properties of which is variable in broad ranges. By simple variation of the procedure steps, the chemical and physical properties of the hollow fibers shall be broadly adaptable to the requirements of the respective use. The method shall be performed in a simple, fast and cost effective manner. Using the method, hollow fibers and hollow fiber membranes shall be producible which correspond to the requirements mentioned above. In addition, the method shall be useful also for the production of endless, continuous hollow fibers.

DETAILED DESCRIPTION OF THE PREFERRED EMBODIMENTS

This problem is solved by providing hollow fibers which are obtainable in that a spinning mass is processed into the shape of hollow fibers, according to general methods, and the said fibers are optionally dried. Subsequently, the resulting hollow fiber is cured by polymerization and/or polyaddition. This curing may be effected for example thermally and/or by radiation induction and/or by chemical induction. From the resulting, cured hollow fiber, the organic components are removed by pyrolysis.

The spinning mass from which the hollow fibers are prepared is obtained a) by hydrolytic polycondensation of
one or more compounds of the general formula I and/or of precondensates derived therefrom,

wherein the radicals and indices have the following meaning:

R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups, R'=organic radical having from 1 to 50 carbon atoms and containing at least one group which can undergo a polymerization or a polyaddition X=hydrogen, halogen, hydroxy, alkoxy, acyloxy, alkylcarbonyl, alkoxycarbonyl or $NR''_2$, wherein with R'' = hydrogen, alkyl or aryl, a=1, 2 or 3, b=1, 2 or 3, with the proviso of a+b=2, 3 or 4, and one or more compounds of the general formulae II and/or III which is/are optionally in the form of (a) complex(es), and/or of precondensates derived thereof,

wherein $M^1$ is aluminum or boron and $M^2$ is titanium or zirconium, the radicals X, R° and R are equal or different, R° is halogen, hydroxy, alkoxy or acyloxy, y is an integer of from 1 to 4, z is 0, 1, 2, or 3 under the proviso that y+z=4, and X and R are defined as in general formula I, and optionally one or more compounds of the general formula IV and/or of precondensates derived therefrom, $$X_aSiR_{4-a} \qquad (IV)$$

wherein the radicals and indices have the following meaning:
R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
X=hydrogen, halogen, hydroxy, alkoxy, acyloxy, alkylcarbonyl, alkoxycarbonyl or $NR''_2$,
with R" hydrogen, alkyl, aryl or alkylaryl,
a=1, 2 or 3, and/or one or more co-condensable compounds of the elements Li, Na, Mg, Ca, Sr, Ba, Zn, Sn or Pb, and, if desired b) by addition of
one or more monomers and/or oligomers which are co-polymerizable and/or can be subjected to a (poly)addition,
and/or one or more curing catalysts,
and/or one or more pore generating additives
and/or one or more compounds of the elements Li, Na, Mg, Ca, Sr, Ba, Zn, Sn and Pb which are soluble in the reaction medium.

The hydrolytic polycondensation is carried out by adding water or moisture and, if desired, in the presence of a solvent and/or of a condensation catalyst. Based on the monomers, the molar ratio of the compound of formula I to the sum of the compounds of formulae II and III is between 99:1 and 1:99.

The spinning mass used to produce the hollow fibers of the invention represents a polycondensate of hydrolytically condensed silicon compounds of formulae I and hydrolytically condensed compounds of formulae II and/or III. In addition, the spinning mass of the invention optionally contains hydrolytically condensed compounds of the general formula IV and/or co-condensates of compounds of the elements Li, Na, Mg, Ca, Sr, Ba, Zn, Sn or Pb. In addition and if required, the polycondensate contains water and/or solvent and/or the additives mentioned above. Depending on its viscosity, the polycondensate may be seen as a more or less viscous liquid or as a resin.

In preferential embodiments of the spinning mass of the present invention, the compounds of general formula I to be used will be compounds of the general formula I':

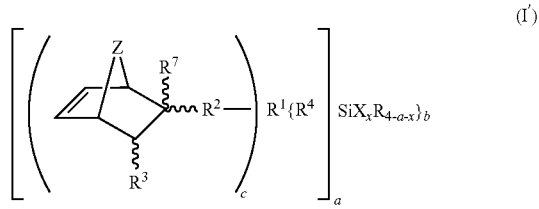
(I')

In the general formula I', the radicals and indices have the following meaning, with the proviso that in case of indices $\geq 2$, the respective radicals may be equal or different.

R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
$R^1$=alkylene, arylene, arylenealkylene or arylenealkylene having from 0 to 20 carbon atoms each, wherein said radicals may contain oxygen atoms and/or sulfur atoms and/or ester and/or carbonyl and/or carboxy and/or amide and/or amino groups,
$R^2$=alkylene, arylene, arylenealkylene or arylenealkylene having from 0 to 20 carbon atoms each, wherein said radicals may contain oxygen and/or sulfur atoms and/or ester and/or carbonyl and/or carboxy and/or amide and/or amino groups,
$R^3$=hydrogen, $R^2$—$R^1$—$R^4$—$SiX_xR_{3-x}$, carboxyl, alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
$R^4$=—(CHR$^6$—CHR$^6$)$_n$—, wherein n is 0 or 1, —CHR$^6$—CHR$^6$—S—R$^5$—, —CO—S—R$^5$—, —CHR$^6$—CHR$^6$—NR$^6$—R$^5$—, —Y—CS—NH—R$^5$—, —S—R$^5$—Y—CO—NH—R$^5$—, —CO—O—R$^5$—, —Y—CO—C$_2$H$_3$(COOH)—R$^5$—, —Y—CO—C$_2$H$_3$(OH)—R$^5$— or —CO—NR$^6$—R$^5$—,
$R^5$=alkylene, arylene, arylenealkylene or arylenealkylene having from 1 to 20 carbon atoms each, wherein said radicals may contain oxygen and/or sulfur atoms and/or ester and/or carbonyl and/or carboxy and/or amide and/or amino groups,
$R^6$=hydrogen, alkyl or aryl having from 1 to 10 carbon atoms,
$R^7$=hydrogen, alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
X=hydrogen, halogen, hydroxy, alkoxy, acyloxy, alkylcarbonyl, alkoxycarbonyl or $NR''_2$, wherein R" is hydrogen, alkyl, alkylaryl or aryl,
Y=—O—, —S— or —NR$_6$—,
Z=—O— or —(CHR$^6$)$_m$—, wherein m=1 or 2,
a=1, 2 or 3, wherein b=1 in case a=2 or 3,
b=1, 2 or 3, wherein a=1 in case b=2 or 3,
c=1 to 6,
x=1, 2 or 3, wherein a+x=2, 3 or 4.

An exhaustive description of organically modified silanes of formula I', of their preparation as well as of concrete examples is given in DE 196 27 198 C2. The disclosure content of DE 196 27 198 C2 is hereby incorporated by reference in its entirety. In specifically preferred embodiments of the hollow fibers of the present invention, organically modified silanes of the general formula I' and/or precondensates derived therefrom are used in which the indices a and/or b and/or c are the integer 1.

In other preferential embodiments of the hollow fibers of the present invention, the compounds of general formula I to be used are compounds of the general formula I".

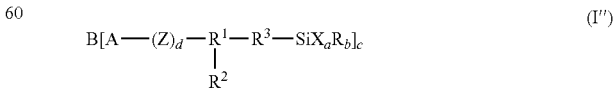
(I")

In the general formula I", the radicals and indices have the following meaning, wherein for indices $\geq 2$, the respective radicals are identical or different.

B=straight-chain or branched organic radical having at least one C=C double bond and from 4 to 50 carbon atoms, R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups, $R^3$ alkylene, arylene, arylenealkylene or arylenealkylene having 0 to 15 carbon atoms each, wherein the said radicals may be interrupted by oxygen atoms and/or sulfur atoms and/or amino groups, X=hydrogen, halogen, hydroxy, alkoxy, acyloxy, alkylcarbonyl, alkoxycarbonyl or $NR''_2$, wherein R'' is hydrogen, alkyl, aryl or alkylaryl, A=O, S or NH in case d=1 and Z=CO and $R^1$ alkylene, arylene, arylenealkylene or arylenealkylene having from 1 to 10 carbon atoms each, wherein the said radicals may be interrupted by oxygen atoms and/or by sulfur atoms and/or by amino groups, and $R^2$=COOH or H;

or

A=O, S, NH or COO in case d=1 and Z=CHR', with the proviso that R'=H, alkyl, aryl or alkylaryl, and $R^1$=alkylene, arylene or alkylenearylene having from 1 to 10 carbon atoms each, wherein the said radicals may be interrupted by oxygen atoms and/or by sulfur atoms and/or by amino groups, and $R^2$=OH;

or

A=OS, NH or COO for d=0 and $R^1$=alkylene, arylene or alkylenearylene having from 1 to 10 carbon atoms each, wherein the said radicals may be interrupted by oxygen atoms and/or by sulfur atoms and/or by amino groups, and $R^2$=OH;

or

A=S in case d=1 and Z=CO and $R^1$=N and $R^2$=H;

a=1, 2 or 3;

b=0, 1 or 2, with the proviso of a+b=3, c=1, 2, 3 or 4.

An exhaustive description of organically modified silanes of the general formula I'' and of their preparation, along with concrete examples, is given in DE 44 16 857 Cl. The disclosure content of DE 44 16 857 C1 is hereby incorporated by reference in its entirety. In specifically preferred embodiments of the hollow fibers of the invention, organically modified silanes of the general formula I'' and/or precondensates derived therefrom are used in which the alkyl and/or alkylene and/or alkoxy groups contain from 1 to 4 carbon atoms. In additional specifically preferred embodiments, the radical B of the general formula I'' contains one or more acrylate and/or methacrylate group.

In other preferential embodiments of the hollow fibers of the present invention, the compounds of general formula I to be used are compounds of the general formula I'''.

In the general formula I''', the radicals and indices have the following meaning, wherein for indices ≧2, the respective radicals are identical or different.

A=O, S, PR'', POR'', NHC(O)O or NHC(O)NR'',

B=straight-chain or branched organic radical derived from a compound B' having at least one (if c=1 and A=NHC(O)O or NHC(O)NR'') or at least two C=C double bounds and from 5 to 50 carbon atoms, R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups, R'=alkylene, arylene or alkylenearylene, R''=hydrogen, alkyl, aryl or alkylaryl, X=hydrogen, halogen, hydroxy, alkoxy, acyloxy, alkylcarbonyl, alkoxycarbonyl or $NR''_2$, a=1, 2 or 3, b=0, 1 or 2, c=0 or 1, x=an integer the maximum value of which corresponds to the number of double bonds in the compound B' minus 1 or is equal to the number of double bonds in the compound B' in case c=1 and A represents NHC(O)O or NHC(O)NR'', respectively.

The above alkyl and alkenyl radicals are optionally substituted straight-chain, branched or cyclic radials having 1 or, respectively, 2 to 20 carbon atoms. Aryl represents optionally substituted phenyl, naphthyl or biphenyl, and the above alkoxy, acyloxy, alkylcarbonyl, alkoxycarbonyl, alkylaryl, arylalkyl, arylene, alkylene, and alkylenearyl radicals are derived from the above-defined alkyl and aryl radicals.

An exhaustive description of organically modified silanes of the general formula I''' and of their preparation, along with concrete examples, is given in DE 40 11 044 C2. The disclosure content of DE 40 11 044 C2 is hereby incorporated by reference in its entirety. In specifically preferred embodiments of the hollow fibers of this inventions, silanes of the general formula I''' and/or precondensates derived therefrom are used, in which the radical B contains one or more acrylate and/or methacrylate group.

In other preferential embodiments of the hollow fibers of the present invention, the compounds of general formula I to be used are compounds of the general formula I''''.

In the general formula I'''', the radicals and indices have the following meaning, wherein for indices ≧2, the respective radicals are identical or different.

R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups, X=hydrogen, halogen, hydroxy, alkoxy, acyloxy, alkylcarbonyl, alkoxycarbonyl or $NR''_2$, wherein R'' is hydrogen, alkyl, aryl or alkylaryl.

Y=an organic radical having from 1 to 30, preferably from 1 to 20 carbon atoms and from 1 to 5, preferably from 1 to 4 mercapto groups, a=1, 2 or 3, x=1, 2 or 3, with the proviso that a+x=2, 3 or 4.

The alkyl radicals are, for example, straight-chain, branched or cyclic radicals having from 1 to 20, especially from 1 to 10 carbon atoms and they are preferably lower alkyl radicals having from 1 to 6, specifically preferably from 1 to 4 carbon atoms. Specific examples are methyl, ethyl, n-propyl, i-propyl, n-butyl, i-butyl, s-butyl, t-butyl, n-pentyl, n-hexyl, cyclohexyl, 2-ethylhexyl, dodecyl and octadecyl. The alkenyl radicals are, for example, straight-chain, branched or cyclic radicals having from 2 to 20, preferably from 2 to 10 carbon atoms and are preferably lower alkenyl radicals having from 2 to 6 carbon atoms, such as vinyl, allyl and 2-butenyl. Preferred aryl radicals are phenyl, biphenyl and naphthyl.

The alkoxy, acyloxy, alkylamino, dialkylamino, alkylcarbonyl, alkoxycarbonyl, arylaklyl, alkylaryl, alkylene and alkylenearylene radicals are preferably derived from the above-mentioned alkyl and aryl radicals. Specific examples are methoxy, ethoxy, n- and i-propoxy, n-, i-, s- and t-butoxy, monomethylamino, monoethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl and tolyl.

The radicals mentioned above may optionally carry one or more substituents, for examples halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxy, formyl, carboxy, mercapto, cyano, isocyanato, nitro, epoxy, $SO_3H$ or $PO_4H_2$. Among the halogens, fluorine, chlorine and bromine, and especially chlorine, are preferred.

In particularly preferred embodiments of the hollow fibers of this invention, the silanes of the general formula I"" to be used are silanes of the general formula V

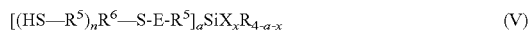

wherein the radicals and indices have the following meaning:
E= —CO—NH—, —CS—NH—, —$CH_2$—$CH_2$— or —$CH_2$—CH(OH)—
R=as defined for general formula IV;
$R^5$=alkylene, arylene, arylenealkylene or arylenealkylene having from 0 to 20 carbon atoms each, wherein the said radicals may be interrupted by oxygen atoms and/or by sulfur atoms and/or by ester and/or by carbonyl and/or by carboxy and/or by amide and/or by amino groups;
$R^6$=alkylene, arylene, arylenealkylene or arylenealkylene having from 0 to 20 carbon atoms each, wherein the said radicals may be interrupted by oxygen atoms and/or by sulfur atoms and/or by ester and/or by carbonyl and/or by carboxy and/or by amide and/or by amino groups;
X=as defined for general formula IV;
a=as defined for general formula IV;
n=2, 3, 4 or 5;
x=as defined for general formula IV.

An exhaustive description of organically modified silanes of this kind and of their preparation, along with concrete examples, is given in DE 196 27 220 C2. The disclosure content of DE 196 27 220 C2 is hereby incorporated by reference in its entirety.

In the general formula IV, the radicals and indices have the following meaning, wherein for indices $\geq 2$, the respective radicals are identical or different.

R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
X=hydrogen, halogen, hydroxy, alkoxy, acyloxy, alkylcarbonyl, alkoxycarbonyl or $NR"_2$, wherein R" is hydrogen, alkyl, aryl or alkylaryl.
a=1, 2 or 3.

The alkyl radicals are, for example, straight-chain, branched or cyclic radicals having from 1 to 20, especially from 1 to 10 carbon atoms and they are preferably lower alkyl radicals having from 1 to 6, specifically preferably from 1 to 4 carbon atoms. Specific examples are methyl, ethyl, n-propyl, i-propyl, n-butyl, i-butyl, s-butyl, t-butyl, n-pentyl, n-hexyl, cyclohexyl, 2-ethylhexyl, dodecyl and octadecyl. The alkenyl radicals are, for example, straight-chain, branched or cyclic radicals having from 1 to 20, preferably from 2 to 10 carbon atoms and are preferably lower alkenyl radicals having from 2 to 6 carbon atoms, such as vinyl, allyl and 2-butenyl. Preferred aryl radicals are phenyl, biphenyl and naphthyl.

The alkoxy, acyloxy, alkylamino, dialkylamino, alkylcarbonyl, alkoxycarbonyl, arylalkyl, alkylaryl, alkylene and alkylenearylene radicals are preferably derived from the above-mentioned alkyl and aryl radicals. Specific examples are methoxy, ethoxy, n- and i-propoxy, n-, i-, s- and t-butoxy, monomethylamino, monoethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl and tolyl.

The radicals mentioned above may optionally carry one or more substituents, for example halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxy, formyl, carboxy, mercapto, cyano, isocyanato, nitro, epoxy, $SO_3H$ or $PO_4H_2$. Among the halogens, fluorine, chlorine and bromine, and especially chlorine, are preferred.

Silanes of the general formula IV are either commercially available or can be prepared in accordance with known methods, as described, for example, in "Chemie und Technologie der Silicone", W. Noll, Verlag Chemie GmbH, Weinheim/Bergstraße (1968).

Without restricting the general nature of the description, concrete examples of silanes of the general formula IV are: $CH_3$—Si—$Cl_3$, $CH_3$—Si—$(OC_2H_5)_3$, $C_2H_5$—Si—$Cl_3$, $C_2H_5$—Si—$(OC_2H_5)_3$, $CH_2$=CH—Si—$(OC_2H_4O CH_3)_3$, $CH_2$=CH—Si—$(OOCCH_3)_3$, $(CH_3)_2$—Si—$(OC_2H_5)_2$, $(CH_3)_2SiCl_2$, $(C_2H_5)_3$—Si—Cl, $(C_2H_5)_2$—Si—$(OC_2H_5)_2$, $(CH_3)_2(CH_2$=CH)—Si—$Cl_2$, $(CH_3)_3$—Si—Cl, $(t-C_4H_9)(CH_3)_2$—Si—Cl, $(CH_3O)_3$—Si—$C_3H_6$—NH—$C_2H_4$—NH—$C_2H_4$—$NH_2$, $(CH_3O)_3$—Si—$C_3H_6$—SH, $(CH_3O)_3$—Si—$C_3H_6$—NH—$C_2H_4$—$NH_2$, $(CH_3O)_3$—Si—$C_3H_6$—Cl, $(CH_3)_2(CH_2$=CH—$CH_2$)—Si—Cl, $(CH_3O)_3$—Si—$C_3H_6$—O—C(O)—C($CH_3$)=$CH_2$, $(C_2H_5O)_3$—Si—$C_3H_6$—$NH_2$, $(C_2H_5O)_3$—Si—$C_3H_6$—CN,

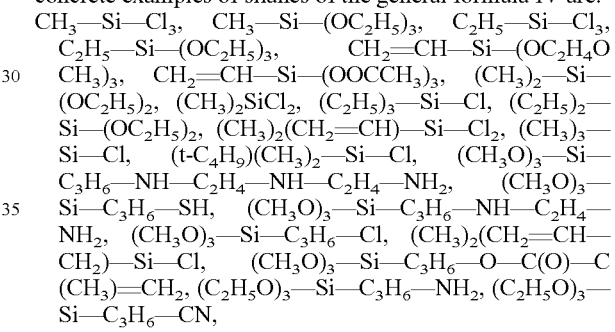

In respect to the hydrolyzable aluminum compounds of the general formula II to be used, reference is made to the specifications in connection with the useful hydrolyzable silicon compounds, as far as the specific (preferred) definitions of the radicals R° are concerned. In this connection, concrete examples may be mentioned as follows: $Al(OCH_3)_3$, $Al(OC_2H_5)_3$, $Al(O-n-C_3H_7)_3$, $Al(O-i-C_3H_7)_3$, $Al(OC_4H_9)_3$, $Al(O-i-C_4H_9)_3$, $AlCl_3$, $AlCl(OH)_2$. Specifically preferred are compounds which are liquid at room temperature, for example aluminum s-butylate and aluminum i-propylate. The aforementioned aluminum compounds may also used in complexated form.

Additional hydrolyzable compounds of the general formula II useful in the preparation of the polyheterocondensates are, for example, boron trihalides and boric acid esters, such as $B(OC_3H_5)_3$, $BCl_3$, $B(OCH_3)_3$ and $B(OC_2H_5)_3$.

Among the hydrolyzable titanium and zirconium compounds of the general formula III, those are preferred in which the value of z is 0, 1 or 3. Those compounds of the latter formula which are particularly preferred are those in which y is 4. Specific examples of useful Zr and Ti compounds are the following:

TiCl$_4$, Ti(OC$_2$H$_5$)$_4$, Ti(OC$_3$H$_7$)$_4$, Ti(O-i-C$_3$H$_7$)$_4$, Ti(OC$_4$H$_9$)$_4$, Zr(2-ethylexoxy)$_4$, ZrCl$_4$, Zr(OC$_2$H$_5$)$_4$, Zr(OC$_3$H$_7$)$_4$, Zr(O-i-C$_3$H$_7$)$_4$, Zr(OC$_4$H$_9$)$_4$, Zr(2-ethylexoxy)$_4$, ZrOCl$_2$.

The silanes of the general formulae I, I', I'', I''', I'''' and IV as well as the compounds of the general formula III are hydrolyzable and polycondensable via the radicals X, the compounds of the general formula II via the radicals R°. By way of the hydrolytic polycondensation, an inorganic network comprising Si—O—Si—, Si—O-M$^1$— and —Si—O-M$^2$-bridges is constructed. The polycondensation preferably takes place in accordance to the sol-gel process, as is described, for example, in DE—A1 27 58 414, 27 58 415, 30 11 761, 38 26 715, and 38 35 968. The polycondensation is carried out in the manner conventional in this field, for example, by adding the required amount of water at room temperature or with slight cooling directly (preferably with stirring and in the presence of a hydrolysis and condensation catalyst) to the compounds to be hydrolyzed which are present either as such or dissolved in a solvent, and then by stirring the resulting mixture for a certain time (one or more hours). If reactive compounds are present, it is generally preferred to add the water in stages. Independently of the reactivity of the compounds present, the hydrolysis takes place in general at temperatures between −20 and 130° C. or at the boiling point of the solvent, if such solvent is employed, respectively. As already indicated, the optimum manner of the addition of water depends above all on the reactivity of the starting compounds used. For example, the dissolved starting compounds may be slowly added drop-wise to an excess of water, or water is added in one or more portions to the starting compounds which optionally are present in solution. It may also be useful not to add the water as such, but to introduce it into the reaction systems with the aid of organic or inorganic systems comprising water. In many cases, it has been proven particularly suitable to introduce the amount of water into the reaction mixture with the aid of moisture-laden adsorbents, e.g. molecular sieves, and of water-comprising organic solvents, for example ethanol in a concentration of 80%. Instead, the addition of water can be made by way of a chemical reaction that liberates water during said reaction. Examples of such reactions are esterification reactions.

If a solvent is used, ketones, preferably lower dialkyl ketones, such as acetone or methylisobutylketone, ethers, preferably lower dialkyl ethers such as diethylether or dibutylether, THF, amides, esters, in particular ethyl acetate, dimethylformamide, amines, in particular triethylamine, and mixtures thereof are also suitable, besides the lower aliphatic alcohols (e.g. ethanol or i-propanol).

The starting compounds need not necessarily all be present at the beginning of the hydrolysis (polycondensation), but it may even prove advantageous in certain cases if only some of these compounds are initially brought into contact with water and the remaining compounds are added later.

In order to avoid precipitations during hydrolysis and polycondensation as far as possible, the addition of water may be effected in a plurality of stages, for example in three stages. In the first stage, a tenths to a twentieths of the amount of water required for hydrolysis may for example be added. After brief stirring, the addition of a fifths to a tenths of the required amount of water may be performed, and, after further brief stirring, the remainder may finally be added.

The condensation time depends on the respective starting components and their proportional amounts, the optionally used catalyst, the reaction temperature, and so on. In general, the polycondensation is effected at atmospheric pressure, but may also be carried out at increased or reduced pressure.

The polycondensate thus obtained may be processed to the hollow fibers of the present invention either as such or after partial or almost complete removal of the used solvent. In some instances, it may be advantageous if, in the product obtained after polycondensation, the excess water and the resulting and the optionally additionally used solvent are replaced by another solvent, in order to stabilize the polycondensate. For this purpose, the reaction mixture may be thickened, for example in vacuo at a slightly elevated temperature, to such an extent that it can still be taken up by another solvent without any risk.

The polycondensate thus obtained is a more or less viscous liquid or a resin, and it may be processed to hollow fibers by conventional methods. After shaping and after drying, if this measure is required, the resulting hollow fiber is cured by polymerization and/or by polyaddition, i.e. by formation of an organic network.

Silanes of the formula I and polycondensates resulting therefrom may be subjected to a polymerization and/or to a polyaddition by way of the radical R', silanes of formula I' and polycondensates resulting therefrom by way of the bi-cyclic radicals, silanes of formulae I'' and I''' as well as the polycondensates thereof by way of the radicals B, and silanes of formulae I'''' and V as well as their polycondensates by way of mercapto groups. Via said polymerization or polyaddition reactions, respectively, an organic network is built up. Consequently, the polycondensate obtained from silanes of formulae I to V and the hollow fiber manufactured therefrom, respectively, can be cured by polymerization and/or by polyaddition and can be strengthened by this measure. Said curing reactions are performed thermally and/or via radiation induction and/or via chemical induction. After curing, an inorganic-organic network is obtained which means that the precursors of the hollow fibers of the present invention comprise an inorganic-organic network. By varying the organic and/or inorganic network, for example the density of the network, it is possible to vary the chemical and physical properties of the hollow fibers of the invention and to adapt the profile of properties of the hollow fibers of the invention according to the requirements of a particular application.

The polycondensate employed for the preparation of the hollow fibers of the present invention may comprise further additives. Such additives may be added prior to and/or during and/or subsequent to the polycondensation step. These additives may comprise, for example, monomers and/or oligomers which are co-polymerizable and/or can be subjected to an addition reaction and/or to a polyaddition reaction. These monomers and oligomers, respectively, are incorporated into the organic network of the precursors of the hollow fibers of the present invention by way of polymerization and/or (poly) addition reactions in the course of the curing of the resultant hollow fiber. Where hydrolyzable silicon compounds having SH and/or C=C and/or amino groups are used, and where they are added prior to the hydrolytic polycondensation, these compounds are incorporated into the inorganic network of the precursors of the hollow fibers of the present invention in the course of the polycondensation, and are incorporated into the organic network of the precursors of the hollow fibers of the present invention in the course of the polymerization and/or (poly)addition.

Further additives which may be contained within the polycondensate used for the preparation of the hollow fibers of the invention are, for example, curing catalysts. These are required for example in case the resulting hollow fiber is cured chemically, or by radiation, UV or thermal induction.

After curing of the precursors of the hollow fibers of the present invention, the organic components are eliminated by pyrolysis, resulting in an inorganic hollow fiber. In preferred embodiments of the hollow fibers of the invention, elimination of the organic components is performed by way of a two-step pyrolysis procedure. According to this procedure, the hollow fibers prepared from the polycondensate and cured and strengthened by polymerization or polyaddition are first converted into an intermediate product which still contains carbon, by way of thermal cracking under inert gas. Suitable temperatures for this step are for example between 350 and 650° C., preferred temperatures are between 400 and 600° C. Subsequently, the remaining carbon is oxygenated in an oxidizing atmosphere at a temperature of e.g. between 500 and 600° C. By this measure, the hollow fiber is subjected to a linear shrinkage of up to 50%.

The inorganic hollow fibers which have been pyrolytically manufactured from the polycondensate are generally microporous. Usually, pores are prepared in the hollow fibers of the present invention in that the organic components of the hollow fiber are removed by thermal cracking and by oxygenation, for example by annealing at 650° C., respectively. Thus, a pore structure in the nanometer area is obtained.

If pores of larger size (mesopores) are desired, additives may be added to the polycondensate used for the preparation of the hollow fibers of the invention, the additives being able to form additional pores, by which additional porosity is imparted to the inventive hollow fibers. Such additives may e.g. be volatile and/or soluble additives which may be removed after curing of the fiber and prior to pyrolysis, for example by way of increasing the temperature and/or by dissolving them out of the fiber, whereby cavities remain in the hollow fiber. For example, a certain porosity may be generated in the hollow fibers of the invention by addition of solvents (e.g. ethyl acetate, ethanol, isopropanol and the like) to the polycondensate and removing same after curing of the hollow fiber. For example, up to 25% by weight of a variety of solvents (e.g. ethyl acetate, ethanol, isopropanol and the like) may be incorporated into the spinning mass by stirring without loosing the ability thereof to be spun. After curing, remaining solvent which is still present in the hollow fiber may be removed either gently by storage at room temperature or forced by heating to about 100° C. in vacuo. By the addition of oils and the removal thereof after curing of the hollow fiber, interstices of larger size, i.e. larger pores are generated. Soluble substances which may be added are for example salts.

Alternatively it is possible to generate pores by the addition of blowing agents to the polycondensate which are able to liberate gases prior to the curing of the hollow fiber by way of thermal stress (e.g. between 150 and 250° C.). Such blowing agents are for example azo compounds, for example azodicarbonamide. Further additives which may be used for the generation of pores are for example derivatives of hydrazine (e.g. 4.4-oxybis(benzenesulfohydrazide), hydrazine carboxamides (e.g. p-toluylenesulfonylsemicarbazide), tetrazoles (e.g. 5-phenyltetrazole) or benzoxazines (e.g. isatoic acid anhydride).

The pore-forming additives may be porous themselves and in this case impart porosity to the hollow fiber by their presence. Without any limitation of the general, such porous additives are for example porous glass particles, perlites, zeolithes, silica gel or diatomaceous earth in spherical or powdered form, respectively.

Hollow fibers according to the invention which are non-permeable are obtained by increasing the temperature to such an extent that the hollow fiber start sintering, and the pores on the surface are closed. Such hollow fibers may be used for the transport of materials.

For the production of continues hollow fibers, it is preferred to use solvent-free systems—although solvent-based systems can likewise be processed—from which hollow fibers are manufactured as follows. First, the resinous polycondensate, i.e. the spinning mass, is extruded through an annular die, the lumen being generated by means of a gas- and/or liquid carrying inner die. The dimension of the resin filament is established in accordance with conventional methods through variation of spinning parameters, such as for example takeoff rate, temperature, pressure, and the like. Subsequently, the resin filament is subjected to an initial cross-linking via an annular initial-curing component, e.g. a radiation source directly below the spinning die, which preserves its shape. Final curing is accomplished by means by an all-round irradiator disposed therebelow. The resulting continuous fiber is wound up and rewound. Initial and/or final curing can be accomplished not only by radiation-induced curing but also by self-induced or chemically induced curing. A combination of different curing principles is also possible.

Curing of the precursors of the hollow fibers of the present invention can be effected by different curing principles, i.e. thermally, radiation induced and/or chemically induced, and in accordance with conventional methods. In some instances, the addition of conventional curing catalysts may be required. The principles and methods of curing are for example described in DE 40 11 044 C2, DE 43 10 733 A1, DE 44 05 261 A1, DE 44 16 857 C1, DE 196 27 198 C2, and DE 196 27 220 C2.

The inorganic-organic precursors of the hollow fibers of the present invention may also be prepared continuously. Pyrolysis of such endless precursors into inorganic hollow fibers may be performed batch-wise or continuously.

The inorganic hollow fibers of the present invention exhibit high permeation values and high selectivity, together with high mechanical stability.

The hollow fibers of the invention are either binary systems consisting of $SiO_2/Al_2O_3$, $SiO_2/B_2O_3$, $SiO_2/TiO_2$ or $SiO_2/ZrO_2$, or they are ternary systems consisting of $SiO_2/Al_2O_3/B_2O_3$, $SiO_2/Al_2O_3/TiO_2$, $SiO_2/Al_2O_3/ZrO_2$, $SiO_2/B_2O_3/TiO_2$, $SiO_2/B_2O_3/ZrO_2$ or $SiO_2/TiO_2/ZrO_2$. Further, quaternary systems, for example $SiO_2/Al_2O_3/B_2O_3$ $TiO_2$, $SiO_2/Al_2O_3/B_2O_3/ZrO_2$ or $SiO_2/Al_2O_3/TiO_2/ZrO_2$ are possible.

The proportion of the respective oxides in the membranes of the present invention may be varied in wide ranges and may easily be controlled via the amount of the hydrolyzable compounds used. The proportion of $SiO_2$ in the hollow fibers of the present invention may be from 1 to 99% by weight, the proportion of $Al_2O_3$ may be from 0 to 99% by weight, that of $B_2O_3$ from 0 to 40% by weight, that of $TiO_2$ from 0 to 50% by weight, and that of $ZrO_2$ from to 99% by weight.

The incorporation of $B_2O_3$ into the hollow fibers of the invention causes an increased chemical resistance against acid and basic liquids, compared to that of pure $SiO_2$ hollow fibers. Further, the temperature stability and the mechanical strength is increased, and the thermal expansion α is lowered.

The incorporation of $ZrO_2$ into the hollow fibers of the invention causes a substantial improvement of the hydrolytic stability, and the incorporation of $Al_2O_3$ causes such an improvement of the thermal and the chemical resistance, both compared to hollow fibers made of pure $SiO_2$.

In order to introduce additional hetero atoms into the hollow fibers of the present invention, co-condensable and/or co-polymerizable compounds of the elements Li, Na, Mg, Ca, Sr, Ba, Zn, Sn and Pb may be used for the preparation of the inventive spinning mass, which are then incorporated into the inorganic network in the course of hydrolytic condensation. Alternatively to the incorporation of the hetero atoms, it is possible to add compounds of the elements Li, Na, Mg, Ca, Sr, Ba, Zn, Sn and Pb which are soluble in the reaction medium. This addition may be performed prior to, during or after the hydrolytic polycondensation.

Without any restriction of the general teaching, useful compounds of this kind are lithium (meth)acrylate, lithium t-butoxide, lithium methoxide, lithium ethoxid, sodium (meth)acrylate, sodium ethoxide, magnesium (meth)acrylate, magnesium methoxide, magnesium ethoxide, magnesium n-propoxide, calcium ethoxide, calcium (meth)acrylate, strontium i-propoxide, strontium methoxide, strontium methoxypropoxide, barium i-propoxide, zinc-II (meth)acrylate, zinc N,N-dimethylaminoethoxide, tin-IV t-butoxide, tin-II ethoxide, lead-II (meth)acrylate and lead-IV-propionate.

These compounds may be added in such amounts that in the resulting inorganic hollow fiber, the proportion of $LiO_2$ and $NaO_2$ is each from 0 to 10% by weight, and that of MgO, CaO, SrO, BaO, ZnO, SnO and PbO is each from 0 to 20% by weight.

The incorporation of $LiO_2$ into the hollow fibers of the present invention results in a lowering of the thermal expansion $\alpha$ and an increased electrical conductivity at 350° C., compared to hollow fibers made of pure $SiO_2$. Such hollow fibers show an increased refractive index n.

The incorporation of $Na_2O$ causes an increase of the thermal expansion $\alpha$, and the incorporation of MgO results in an increased dielectric constant $\epsilon$ as well as a lowered thermal expansion $\alpha$. By the incorporation of CaO and SrO, the thermal expansion $\alpha$, the refractive index n and the mechanical strength of the hollow fibers are increased. The incorporation of BaO results in an increased mechanical strength, that of ZnO in a refractive index n increment, that of SnO in a refractive index n increment and an increased X-ray absorption, and that of PbO in a refractive index n increment and an increase of the thermal expansion $\alpha$ and of the X-ray absorption.

The hollow fibers of the invention may be used for the transport of materials and for a wide variety of separation procedures, especially for the separation of gases, for dialysis, for pervaporation and for micro, ultra and hyper filtration.

The preparation of the hollow fibers of the present invention are now described in more detail by way of examples.

EXAMPLE 1

Inorganic hollow fibers for the separation of gases

Starting Compounds:

| A | |
|---|---|
| glycerol 1,3-dimethacrylate | 0.1 mol |
| dibutyltindilaurate | 0.001 mol |
| 3-isocyanatopropyltriethoxysilane | 0.1 mol |
| $H_2O$/mol silane | 2.4 mol |
| $NH_4F$/mol silane | 0.01 mol |
| B | |
| zirconium propylate (79.8%) | 0.04 mol |
| [2(methacrylolyloxy)ethyl acetoacetate] (AEME) | 0.04 mol |
| methacrylic acid | 0.04 mol |
| $H_2O$/mol silane | 2.4 mol |
| $NH_4F$/mol zirconium propylate | 0.01 mol |

Synthesis:

A 24.7 g (0.1 mol) 3-isocyanatopropyltriethoxysilane are added dropwise to 22.8 g (0.1 mol) glycerol 1,3-dimethacrylate and 0.63 g (0.001 mol) dibutyltindilaurate (as addition catalyst) with cooling and under a protective gas atmosphere. After stirring for 24 hrs, 100 ml ethyl acetate are added.

16.4 g (0.04 mol) zirconium propylate (79.8%) are added dropwise to 8.57 g (0.04 mol) AEME with cooling and under a protective gas atmosphere. After stirring for 30 min. in an ice cooling bath, 3.44 g (0.04 mol) methacrylic acid are added dropwise.

After stirring for 30 min., B is slowly added to A dropwise at 25° C., and subsequently, immediately hydrolysis is started. After 6 days the charge is worked up, shaken out with water, filtered, and evaporated, and the volatile components are completely eliminated, using an oil pump.

Solid matter: 93,3%.

Viscosity after 25 days: 104 Pas (25° C.).

Hollow Fiber Production:

The resin (viscosity at process temperature (15° C.): about 400 Pas), mixed with a photoinitiator (e.g. 2% Irgacure 184, Ciba Geigy), is extruded through an annular die (external diameter: about 1 mm, thickness of annulus: about 0.2 mm). The geometry of the hollow filament is initially stabilized by means of a second, concentric inner die which is flushed with $N_2$, until organic curing is effected by a combination of two UV radiation units (e.g. Blue-Point II, Fa. Hönle, with an all-round irradiator F300, Firma Fusion).

| Spinning parameters: | Spinning temperature: | 15° C. |
|---|---|---|
| | Spinning pressure: | 18 bar |
| | take-off speed: | 0.3 m/s |

The hollow fiber is subsequently wound up. By varying the spinning parameters (spinning-mass temperature, pressure, take-off speed, gas flow rate through the inner channel), it is possible to vary the fiber geometry over wide ranges. In the present case, the geometry of the hollow fiber obtained in long-term operation was about 250 μm for the external diameter and about 33 μm for the wall thickness.

Pyrolysis:

By pyrolysis, the organic components are eliminated, and an inorganic hollow fiber is obtained having the following properties:

Properties of the Inorganic Hollow Fibers:

diameter: 105 μm, wall thickness: 22 μm, tensile strength: 160 MPa modulus of elasticity: about 19 GPa good operability/handling high pressure resistance up to 300 bar low pore size in the range of 1.4 to 2.0 nm, relatively narrow pore size distribution, high inner surface area: 230 $m^2/g$.

separation of molecules in aqueous media in the range of 1 to 6 nm possible.

EXAMPLE 2

SiO$_2$:Al$_2$O$_3$=70% by weight: 30% by weight

Starting Compounds:

| A | |
|---|---|
| glycerol 1,3-dimethacrylate | 0.0416 mol |
| dibutyltindilaurate | 0.000416 mol |
| 3-isocyanatopropyltriethoxysilane | 0.0416 mol |
| H$_2$O/mol silane | 1.5 mol |
| B | |
| aluminum sec.-butylate | 0.0166 mol |
| methacrylic acid | 0.0456 mol |

Synthesis:

A 10.31 g (0.0416 mol) 3-isocyanatopropyltriethoxysilane are added dropwise to 9.51 g (0.0416 mol) glycerol 1.3-dimethacrylate and 0.262 g (0.000416 mol) dibutyltindilaurate (as addition catalyst) with cooling and under a protective gas atmosphere. After stirring for 24 hrs., 41.6 g toluene are added. Hydrolysis is started at 30° C.

B 1.08 g (0.0456 mol) methacrylic acid are added to 4.15 g (0.0166 mol) aluminum sec.-butylate and 1.68 g toluene under a protective gas atmosphere.

After stirring for 24 hrs. at 30° C., B is slowly added to A. After stirring for 6 days, the volatile components are completely removed, using an oil pump.

Solid matter: 94.5%

Viscosity (after 6 days): 245 Pas (25° C.), 46 Pas (40° C.)

EXAMPLE 3

SiO$_2$:Al$_2$O$_3$=90% by weight: 10% by weight

Starting Compounds:

| A | |
|---|---|
| glycerol 1,3-dimethacrylate | 0.125 mol |
| dibutyltindilaurate | 0.00125 mol |
| 3-isocyanatopropyltriethoxysilane | 0.125 mol |
| H$_2$O/mol silane | 1.5 mol |
| B | |
| aluminum sec.-butylate | 0.0133 mol |
| methacrylic acid | 0.0100 mol |

Synthesis:

A 30.97 g (0.125 mol) 3-isocyanatopropyltriethoxysilane are added dropwise to 28.57 g (0.125 mol) glycerol 1.3-dimethacrylate and 0.788 g (0.00125 mol) dibutyltindilaurate (as addition catalyst) with cooling and under a protective gas atmosphere. After stirring for 24 hrs., 120.9 g toluene are added. Hydrolysis is started at 30° C.

B 0.86 g (0.0100 mol) methacrylic acid are added to 3.27 g (0.0133 mol) aluminum sec.-butylate and 4.05 g toluene under a protective gas atmosphere.

After stirring for 24 hrs. at 30° C., B is slowly added to A. After stirring for 6 days, the volatile components are completely removed, using an oil pump.

Solid matter: 96.6%

Viscosity (after 6 days): 209 Pas (25° C.), 35 Pas (40° C.)

EXAMPLE 4

SiO$_2$:TiO$_2$=70% by weight: 30% by weight

Starting Materials:

| A | |
|---|---|
| glycerol 1,3-dimethacrylate | 0.171 mol |
| dibutyltindilaurate | 0.00171 mol |
| 3-isocyanatopropyltriethoxysilane | 0.171 mol |
| B | |
| titanium propylate | 0.054 mol |
| methacrylic acid | 0.081 mol |
| H$_2$O/mol silane | 1.5 mol |
| NH$_4$F | 0.01 mol |

Synthesis:

A 42.37 g (0.171 mol) 3-isocyanatopropyltriethoxysilane are added dropwise to 39.09 g (0.171 mol) glycerol 1,3-dimethacrylate and 1.078 g (0.00171 mol) dibutyltindilaurate (as addition catalyst) with cooling and under a protective gas atmosphere and stirred for 24 hrs.

B 6.97 g (0.081 mol) methacrylic acid is added to 15.38 g (0.054 mol) titanium propylate and 6.97 g ethyl acetate under a protective gas atmosphere and with cooling in an ice bath.

After stirring for 1 hr., B is slowly added to A, and 164 g ethyl acetate are added. The NH$_4$F which has been dissolved in water is extremely slowly added within one hour drop by drop, and therewith, hydrolysis is started. After 6 hours, the volatile components are completely removed, using an oil pump.

Solid matter: 92,5%.

Viscosity (after 6 days): 850 Pas (25° C.), 136 Pas (40° C.).

We claim:

1. A method for the preparation of inorganic microporous or meso porous hollow fibers, comprising SiO$_2$ and at least one oxide of aluminum, boron, titanium, and zirconium, comprising the steps of:
    (a) spinning a spinning mass, which comprises a liquid or solid polycondensate resin of at least one hydrolytically condensed silicon compound of formula I and at least one hydrolytically condensed compounds of formulae II and/or III, to a hollow fiber by extruding the spinning mass through an annular die;
    (b) curing said hollow fiber thermally and/or via radiation induction and/or via chemical induction by polymerization and/or by polyaddition; and
    (c) converting the hollow fiber into an intermediate product containing carbon, by way of thermal cracking under inert gas, and subsequently, (d) removing the organic components from the cured hollow fiber via pyrolysis in an oxidizing atmosphere, wherein formula I comprises $$SiX_aR^1_bR_{(4-a-b)} \quad (I)$$

wherein the radicals and indices have the following meaning:
R = alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
R' = organic radical having from 1 to 50 carbon atoms and containing at least one group which can undergo a polymerization or a polyaddition,
X = hydrogen, halogen, hydroxy, alkoxy, acyloxy, alkylcarbonyl, alkoxycarbonyl or $NR''_2$, wherein R''=hydrogen, alkyl or aryl,
a=1, 2 or 3,
b=1, 2 or 3, with the proviso that a+b=2, 3 or 4;
formulae II and/or III comprises $$M^1R°_3 \text{ (II)} \quad M^2X_yR_z \quad (III)$$

wherein $M^1$ is aluminum or boron and $M^2$ is titanium or zirconium, the radicals X, R° and R are equal or different, R° is halogen, hydroxy, alkoxy or acyloxy, y is an integer of from 1 to 4, z is 0, 1, 2, or 3 under the proviso that y+z=4, and X and R are defined as in formula I; and wherein the lumen of the annular die includes a gas and/or liquid carrying inner die.

2. The method according to claim 1, wherein the thermal cracking is performed at 350-650° C. and/or the remaining carbon is removed from the said carbon-containing intermediate at 500-600° C.

3. The method according to claim 1, wherein the silicon compounds of formula I are compounds of formula I' and/or of precondensates derived thereof,

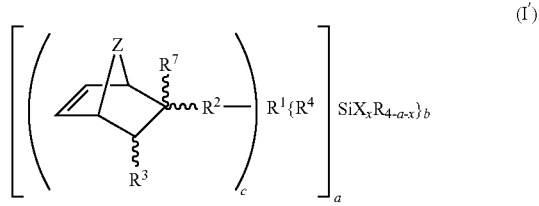

wherein the radicals and indices have the following meaning:
R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
$R^1$=alkylene, arylene, arylenealkylene or arylenealkylene having from 0 to 20 carbon atoms each, wherein said radicals may contain oxygen atoms and/or sulfur atoms and/or ester and/or carbonyl and/or carboxy and/or amide and/or amino groups,
$R^2$=alkylene, arylene, arylenealkylene or arylenealkylene having from 0 to 20 carbon atoms each, wherein said radicals may contain oxygen and/or sulfur atoms and/or ester and/or carbonyl and/or carboxy and/or amide and/or amino groups,
$R^3$=hydrogen, $R^2$—$R^1$—$R^4$—$SiX_xR_{3-x}$, carboxyl, alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
$R^4$=—$(CHR^6$—$CHR^6)_n$—, wherein n is 0 or 1, —$CHR^6$—$CHR^6$—S—$R^5$—, —CO—S—$R^5$—, —$CHR^6$—$CHR^6$—$NR^6$—$R^5$—, —Y—CS—NH—$R^5$—, —S—$R^5$—Y—CO—NH—$R^5$—, —CO—O—$R^5$—, —Y—CO—$C_2H_3$(COOH)—$R^5$—, —Y—CO—$C_2H_3$(OH)—$R^5$— or —CO—$NR^6$—$R^5$—,
$R^5$=alkylene, arylene, arylenealkylene or arylenealkylene having from 1 to 20 carbon atoms each, wherein said radicals may contain oxygen atoms and/or sulfur atoms and/or ester and/or carbonyl and/or carboxy and/or amide and/or amino groups,
$R^6$=hydrogen, alkyl or aryl having from 1 to 10 carbon atoms,
$R^7$=hydrogen, alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
X=hydrogen, halogen, hydroxy, alkoxy, acyloxy, alkylcarbonyl, alkoxycarbonyl or $NR''_2$,
wherein R'' is hydrogen, alkyl, alkylaryl or aryl,
Y=—O—, —S— or —$NR^6$—,
Z=—O— or —$(CHR^6)_m$—, wherein m=1 or 2,
a=1, 2 or 3, wherein b=1 in case a=2 or 3,
b=1, 2 or 3, wherein a=1 in case b=2 or 3,
c=1 to 6,
x=1, 2 or 3, wherein a+x=2, 3 or 4.

4. The method according to claim 1, wherein the silicon compounds of formula I are compounds of formula I'' and/or of precondensates derived thereof,

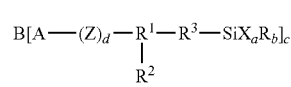

wherein the radicals and indices have the following meaning:
B=straight-chain or branched organic radical having at least one C=C double bond and from 4 to 50 carbon atoms,
R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
$R^3$ =alkylene, arylene, arylenealkylene or alkylenearylene having from 0 to 10 carbon atoms each, wherein the said radicals may be interrupted by oxygen atoms and/or by sulfur atoms and/or by amino groups.
X=hydrogen, halogen, hydroxy, alkoxy, acyloxy, alkylcarbonyl, alkoxycarbonyl or $NR''_2$,
wherein R'' is hydrogen, alkyl, aryl or alkylaryl
A=O, S or NH
in case d =1 and Z =CO and
$R^1$ =alkylene, arylene, or alkylenearylene having from 1 to 10 carbon atoms each, wherein the said radicals may be interrupted by oxygen atoms and/or by sulfur atoms and/or by amino groups, and $R^2$=COOH or H, or A=O, S, NH or COO in case d=1 and Z=CHR', with the proviso that R' =H, alkyl, aryl or alkylaryl,
and
$R^1$=alkylene, arylene or alkylenearylene having from 1 to 10 carbon atoms each, wherein the said radicals may be interrupted by oxygen atoms and/or sulfur atoms and/or amino groups,
and
$R^2$=OH, or A=O, S, NH or COO
in case d=0 and
$R^1$=alkylene, arylene or alkylenearylene having from 1 to 10 carbon atoms each, wherein the said radicals may be interrupted by oxygen atoms and/or by sulfur atoms and/or by amino groups, and
$R^2$=OH, or A=S
in case d=1 and Z=CO and
$R^1$=N and
$R^2$=H, a=1, 2 or 3,
b=0, 1 or 2, with the proviso of a+b=3,
c=1, 2, 3 or 4.

5. The method according to claim 1, wherein the silicon compounds of formula I are compounds of formula I'' and/or of precondensates derived thereof,

  (I''')

wherein the radicals and indices have the following meaning:

A=O, S, PR'', POR'', NHC(O)O or NHC(O)NR'',

B=straight-chain or branched organic radical derived from a compound B' having at least one (if c=1 and A=NHC(O)O or NHC(O)NR'') or at least two C=C double bounds and from 5 to 50 carbon atoms, R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups, R'=alkylene, arylene or alkylenearylene, R''=hydrogen, alkyl, aryl or alkylaryl, X =hydrogen, halogen, hydroxy, alkoxy, acyloxy, alkylcarbonyl, alkoxycarbonyl or NR''$_2$, a=1, 2 or 3,
b=0, 1 or 2,
c=0 or 1, x=an integer the maximum value of which corresponds to the number of double bonds in the compound B' minus 1 or is equal to the number of double bonds in the compound B' in case c=1 and A represents NHC(O)O or NHC(O)NR'', wherein the above alkyl and alkenyl radicals, respectively, are optionally substituted straight-chain, branched or cyclic radicals having from 1 or, respectively, 2 to 20 carbon atoms, aryl is optionally substituted phenyl, naphthyl or biphenyl, and the above alkoxy, acyloxy, alkylcarbonyl, alkoxycarbonyl, alkylaryl, arylalkyl, arylene, alkylene, and alkylenearyl radicals are derived from the above-defined alkyl and aryl radicals.

6. The method according to claim 1, wherein the silicon compounds of formula I are compounds of formula I'''' and/or of precondensates derived thereof,

  (I'''')

wherein the radicals and indices have the following meaning:

R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups, X=hydrogen, halogen, hydroxy, alkoxy, acyloxy, alkylcarbonyl, alkoxycarbonyl or NR''$_2$,
wherein R' is hydrogen, alkyl, aryl or alkylaryl, Y=an organic radical having from 1 to 30, preferably from 1 to 20 carbon atoms and from 1 to 5, preferably from 1 to 4 mercapto groups, a=1, 2 or 3,
x=1, 2 or 3, with the proviso that a+x =2, 3 or 4.

7. The method according to claim 6, wherein the silicone compounds of formula I'''' are silicone compounds of formula V

  (V)

wherein the radicals and indices have the following meaning:
E=—CO—NH—, —CS—NH—, —CH$_2$—CH$_2$—or —CH$_2$—CH(OH)—

R =as defined for formula IV;

$R^5$ =alkylene, arylene, arylenealkylene or arylenealkylene having from 0 to 20 carbon atoms each, wherein the said radicals may be interrupted by oxygen atoms and/or by sulfur atoms and/or by ester and/or by carbonyl and/or by carboxy and/or by amide and/or by amino groups;

$R^6$ =alkylene, arylene, arylenealkylene or arylenealkylene having from 0 to 20 carbon atoms each, wherein the said radicals may be interrupted by oxygen atoms and/or sulfur atoms and/or by ester and/or by carbonyl and/or by carboxy and/or by amide and/or by amino groups;

X=as defined for formula IV;
a=as defined for formula IV;
n=2, 3, 4 or 5;
x=as defined for formula IV.

8. The method according to claim 1, wherein the spinning mass contains one or more organic compounds having one or more mercapto groups.

9. The method according to claim 1, wherein the spinning mass contains one or more organic compounds having one or more substituted and/or unsubstituted amino groups.

10. The method according to claim 1, wherein the spinning mass contains one or more salts and/or one or more liquids and/or one or more blowing agents and/or one or more porous fillers as additives in order to generate pores.

11. The method according to claim 1, wherein the spinning mass is obtained by the addition of one or more pore generating additives and said additives are eluted and/or removed via thermal treatment after curing.

12. The method according to claim 1, wherein the inorganic hollow fiber contains 1 to 99% by weight SiO$_2$ and 0 to 99% by weight Al$_2$O$_3$ and/or 0 to 50% by weight B$_2$O$_3$ and/or 0 to 50% by weight TiO$_2$ and/or 0 to 99% by weight ZrO$_2$.

13. The method according to claim 12, wherein the inorganic hollow fiber contains 0 to 10% by weight LiO$_2$ and/or 0 to 10% by weight Na$_2$O and/or 0 to 20% by weight MgO and/or 0 to 20% by weight CaO and/or 0 to 20% by weight SrO and/or 0 to 20% by weight BaO and/or 0 to 20% by weight ZnO and/or 0 to 20% by weight SnO and/or 0 to 20% by weight PbO.

14. The method according to claim 1, wherein the spinning mass comprises a liquid or solid polycondensate resin of hydrolytically condensed silicon compounds of formula I and/or precondensates derived therefrom, hydrolytically condensed compounds of formulae II and/or III, and hydrolytically condensed compounds of
formula IV and/or of precondensates derived therefrom, $$X_aSiR_{4-a} \qquad (IV)$$

wherein the radicals and indices have the following meaning:
- R=alkyl, alkenyl, aryl, alkylaryl or arylalkyl having from 1 to 20 carbon atoms each, wherein said radicals may contain oxygen and/or sulfur atoms and/or ester and/or carbonyl and/or carboxy and/or amide and/or amino groups,
- X=hydrogen, halogen, hydroxy, alkoxy, acyloxy, alkylcarbonyl, alkoxycarbonyl or NR''$_2$,
  wherein R''=hydrogen, alkyl, aryl or alkylaryl,
- a=1, 2 or 3, and/or
one or more co-condensable compounds of the elements Li, Na, Mg, Ca, Sr, Ba, Zn, Sn or Pb.

15. The method according to claim 14, wherein the one or more compounds of formulae II and/or III is/are in the form of (a) complex(es) and/or of pre-condensates derived thereof.

16. The method according to claim 1, wherein the spinning mass is obtained by
(a) hydrolytic polycondensation
   of one or more compounds of formula I and/or of precondensates derived therefrom and
   of one or more compounds of the formulae II and/or III, and (b) by addition of at least one of:
   one or more monomers and/or oligomers which are co-polymerizable and/or can be subjected to a (poly) addition,
   one or more curing catalysts,
   one or more pore generating additives, or
   one or more compounds of the elements Li, Na, Mg, Ca, Sr, Ba, Zn, Sn and Pb which are soluble in the reaction medium.

17. The method according to claim 1, wherein the hollow fiber is dried prior to curing.

18. The method according to claim 1, wherein the polycondensate resin comprising the spinning mass is obtained by hydrolytic polycondensation of at least one or more compounds of formula I and/or of precondensates derived therefrom and one or more compounds of formulae II and/or III.

19. The method according to claim 1, wherein curing said hollow fiber is performed via an annular initial curing component prior to a final curing step.

20. The method according to claim 19, wherein initial and/or final curing is accomplished by radiation-induced curing and/or by chemically-induced curing.

21. The method according to claim 20, wherein the final curing step is accomplished by an all-round device.

22. The method according to claim 20, wherein initial and/or final curing is accomplished by radiation-induced curing, wherein the final curing step is accomplished by means of an all-round irradiator disposed below the annular initial-curing component.

23. The method according to claim 1, wherein the hollow fiber is subjected to a linear shrinkage of up to 50%.

* * * * *

UNITED STATES PATENT AND TRADEMARK OFFICE
CERTIFICATE OF CORRECTION

PATENT NO. : 7,850,881 B2
APPLICATION NO. : 10/900380
DATED : December 14, 2010
INVENTOR(S) : Herbert Wolter et al.

It is certified that error appears in the above-identified patent and that said Letters Patent is hereby corrected as shown below:

At col. 3, line 20, the phrase "with R" hydrogen" should appear as --with R" = hydrogen--.

At col. 4, lines 22–23, the phrase "—S—$R^5$—Y—CO—NH—$R^5$—" should appear as -- —S—$R^5$—, —Y—CO—NH—$R^5$— --.

At col. 4, line 40, the phrase "Y = —O—, —S— or —$NR_6$—," should appear as --Y = —O—, —S— or —$NR^6$—,--.

At col. 5, line 7, the phrase "$R^3$alkylene" should appear as --$R^3$=alkylene--.

At col. 5, line 15, the phrase "$R^1$alkylene" should appear as --$R^1$=alkylene--.

At col. 5, lines 58-59, the formula "$\{X_aR_bSi[(R'A)_c]_{(4-a-b)}\}X^B$" should appear as "$\{X_aR_bSi[(R'A)_c]_{(4-a-b)}\}xB$--.

At col. 8, line 56, the phrase "$Al(O-i-C_4H_9)_3$, $AlCl_3$" should appear as --$Al(O-i-C_4H_9)_3$, $Al(O-s-C_4H_9)_3$, $AlCl_3$--.

At col. 9, line 5, the phrase "$Ti(OC_4H_9)_4$, $Zr(2\text{-ethylexoxy})_4$" should appear as --$Ti(OC_4H_9)_4$, $Ti(2\text{-ethylhexoxy})_4$--.

At col. 9, line 6, the phrase "$Zr(2\text{-ethylexoxy})_4$" should appear as --$Zr(2\text{-ethylhexoxy})_4$--.

At col. 12, line 43–44, the phrase "$SiO_2/B_2O_3/TiO_2$, $SiO_2$, $SiO_2/B_2O_3/ZrO_2$" should appear as --$SiO_2/B_2O_3/TiO_2$, $SiO_2/B_2O_3/ZrO_2$--.

At col. 12. line 44, the phrase "$SiO_2/Al_2O_3/B_2O_3$ $TiO_2$," should appear as --$SiO_2/Al_2O_3/B_2O_3/TiO_2$,--.

At col. 19, line 32, the phrase "formula 1'"" should appear as --formula'"--.

Signed and Sealed this
Twelfth Day of July, 2011

David J. Kappos
*Director of the United States Patent and Trademark Office*

CERTIFICATE OF CORRECTION (continued)
U.S. Pat. No. 7,850,881 B2

At col. 20, line 14, the phrase "wherein R'" should appear as --wherein R"--.